United States Patent
Lobo et al.

(10) Patent No.: US 8,301,762 B1
(45) Date of Patent: Oct. 30, 2012

(54) SERVICE GROUPING FOR NETWORK REPORTING

(75) Inventors: Shane A. Lobo, Orlando, FL (US); Brian Lushear, Orlando, FL (US); Kirk Myers, Herndon, VA (US); Steve D. Parrott, Clifton, VA (US); Drew A. Shinholster, Jr., Maitland, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

(21) Appl. No.: 12/480,681

(22) Filed: Jun. 8, 2009

(51) Int. Cl.
*G06F 15/173* (2006.01)

(52) U.S. Cl. ........................................ 709/224
(58) Field of Classification Search .................. 709/224
See application file for complete search history.

(56) References Cited

U.S. PATENT DOCUMENTS

| | | | |
|---|---|---|---|
| 5,825,775 A * | 10/1998 | Chin et al. ..................... | 370/401 |
| 5,898,826 A | 4/1999 | Pierce et al. | |
| 6,046,988 A | 4/2000 | Schenkel et al. | |
| 6,393,483 B1 * | 5/2002 | Latif et al. ..................... | 709/226 |
| 6,570,867 B1 * | 5/2003 | Robinson et al. ............. | 370/351 |
| 6,650,347 B1 * | 11/2003 | Nulu et al. ..................... | 715/853 |
| 6,700,967 B2 | 3/2004 | Kleinöder et al. | |
| 6,788,697 B1 * | 9/2004 | Aweya et al. .................. | 370/412 |
| 6,792,273 B1 | 9/2004 | Tellinger et al. | |
| 6,813,634 B1 | 11/2004 | Ahmed | |
| 6,973,042 B1 | 12/2005 | Fitzgerald | |
| 6,978,223 B2 | 12/2005 | Milliken | |
| 7,016,301 B1 * | 3/2006 | Moore ........................... | 370/235 |
| 7,099,305 B1 | 8/2006 | Fardid | |
| 7,099,912 B2 | 8/2006 | Ishizaki et al. | |
| 7,110,362 B2 | 9/2006 | Kato | |
| 7,143,152 B1 * | 11/2006 | Elman et al. .................. | 709/223 |
| 7,213,021 B2 | 5/2007 | Taguchi et | |
| 7,376,719 B1 | 5/2008 | Shafer et al. | |
| 7,376,864 B1 | 5/2008 | Hu et al. | |
| 7,424,526 B1 | 9/2008 | Hansen et al. | |
| 7,464,152 B2 * | 12/2008 | Ishizaki et al. ................ | 709/223 |
| 7,467,225 B2 | 12/2008 | Anerousis et al. | |
| 7,751,392 B1 * | 7/2010 | Gonzalez et al. ............. | 370/389 |
| 7,830,816 B1 | 11/2010 | Gonzalez et al. | |
| 7,831,709 B1 * | 11/2010 | Ham et al. ..................... | 709/224 |
| 7,869,432 B1 * | 1/2011 | Mollyn .......................... | 370/389 |
| 7,904,533 B1 * | 3/2011 | Gonzalez et al. ............. | 709/220 |

(Continued)

OTHER PUBLICATIONS

Gonzalez, Jose, et al., "Virtual Link Mapping", U.S. Appl. No. 11/746,273, filed May 9, 2007.

(Continued)

*Primary Examiner* — Imad Hussain

(57) ABSTRACT

A system provides service grouping in network reporting. A data retriever retrieves router configuration data from data stores for routers in a service provider network. A data analysis tool parses the router configuration data to create port data for each port on each router in the service provider network and integrates the port data with customer data to create an integrated database. The data analysis tool identifies ports associated with a customer, identifies the ports associated with the customer which are bundled into bundled logical ports, and identifies the ports associated with the customer which are partitioned into partitioned logical ports. The data analysis tool creates a hierarchy of port information based on the ports associated with the customer, the bundled logical ports, the partitioned logical ports, and a service provided to the customer. A user interface displays the hierarchy of port information to promote troubleshooting ports.

18 Claims, 5 Drawing Sheets

U.S. PATENT DOCUMENTS

| | | | |
|---|---|---|---|
| 7,904,553 B1 | 3/2011 | Ham et al. | |
| 7,917,854 B1* | 3/2011 | Beaudoin et al. | 715/734 |
| 2002/0022985 A1 | 2/2002 | Guidice et al. | |
| 2002/0078232 A1 | 6/2002 | Simpson et al. | |
| 2002/0087393 A1 | 7/2002 | Philonenko | |
| 2002/0101821 A1* | 8/2002 | Feldmann et al. | 370/232 |
| 2002/0103631 A1* | 8/2002 | Feldmann et al. | 703/22 |
| 2002/0103921 A1 | 8/2002 | Nair et al. | |
| 2002/0164007 A1 | 11/2002 | Henits | |
| 2002/0181047 A1 | 12/2002 | Lauder et al. | |
| 2002/0186259 A1* | 12/2002 | Meandzija et al. | 345/853 |
| 2003/0055972 A1 | 3/2003 | Fuller et al. | |
| 2003/0145072 A1 | 7/2003 | Lau et al. | |
| 2004/0006618 A1 | 1/2004 | Kasai et al. | |
| 2004/0031059 A1* | 2/2004 | Bialk et al. | 725/129 |
| 2004/0059781 A1 | 3/2004 | Yoakum et al. | |
| 2004/0064581 A1 | 4/2004 | Shitama et al. | |
| 2004/0071164 A1 | 4/2004 | Baum | |
| 2004/0139193 A1* | 7/2004 | Refai et al. | 709/224 |
| 2004/0210621 A1 | 10/2004 | Antonellis | |
| 2004/0264484 A1* | 12/2004 | Kui et al. | 370/402 |
| 2005/0091482 A1* | 4/2005 | Gray et al. | 713/151 |
| 2005/0094653 A1 | 5/2005 | Milburn et al. | |
| 2005/0240835 A1 | 10/2005 | Dragnea et al. | |
| 2006/0146694 A1 | 7/2006 | Hamaguchi et al. | |
| 2006/0187855 A1 | 8/2006 | Booth, III et al. | |
| 2006/0215577 A1 | 9/2006 | Guichard et al. | |
| 2006/0268740 A1 | 11/2006 | Rosenberg et al. | |
| 2007/0041554 A1 | 2/2007 | Newman et al. | |
| 2007/0050497 A1 | 3/2007 | Haley et al. | |
| 2007/0053368 A1* | 3/2007 | Chang et al. | 370/401 |
| 2007/0250625 A1 | 10/2007 | Titus | |
| 2007/0274285 A1 | 11/2007 | Werber et al. | |
| 2008/0002975 A1* | 1/2008 | Vukovic et al. | 398/57 |
| 2008/0317039 A1* | 12/2008 | Satterlee et al. | 370/395.5 |
| 2009/0067324 A1* | 3/2009 | Licardie et al. | 370/225 |
| 2009/0201911 A1 | 8/2009 | DuPertuis et al. | |
| 2009/0222547 A1* | 9/2009 | Boylan et al. | 709/223 |
| 2010/0195489 A1* | 8/2010 | Zhou et al. | 370/216 |

OTHER PUBLICATIONS

Baader II, Michael Joseph, et al., "Associating Problem Tickets Based on Integrated Network and Customer Database," U.S. Appl. No. 12/546,351, filed Aug. 24, 2009.

Office Action dated Mar. 2, 2009, U.S. Appl. No. 11/551,704, filed Oct. 21, 2006.

Final Office Action dated Aug. 13, 2009, U.S. Appl. No. 11/551,704, filed Oct. 21, 2006.

Office Action (Advisory Action) dated Oct. 16, 2009, U.S. Appl. No. 11/551,704, filed Oct. 21, 2006.

Office Action dated Dec. 31, 2009, U.S. Appl. No. 11/551,704, filed Oct. 21, 2006.

Office Action dated May 20, 2010, U.S. Appl. No. 11/551,704, filed Oct. 21, 2006.

Notice of Allowance dated Oct. 28, 2010, U.S. Appl. No. 11/551,704, filed Oct. 21, 2006.

Supplemental Notice of Allowance dated Dec. 8, 2010, U.S. Appl. No. 11/551,704, filed Oct. 21, 2006.

Office Action dated Jun. 15, 2009, U.S. Appl. No. 11/620,140, filed Jan. 5, 2007.

Final Office Action dated Nov. 27, 2009, U.S. Appl. No. 11/620,140, filed Jan. 5, 2007.

Advisory Action dated Feb. 17, 2010, U.S. Appl. No. 11/620,140, filed Jan. 5, 2007.

Notice of Allowance dated Mar. 22, 2010, U.S. Appl. No. 11/620,140, filed Jan. 5, 2007.

Office Action dated May 25, 2010, U.S. Appl. No. 11/746,273, filed May 9, 2007.

Final Office Action dated Nov. 19, 2010, U.S. Appl. No. 11/746,273, filed May 9, 2007.

Advisory Action dated Feb. 10, 2011, U.S. Appl. No. 11/746,273, filed May 9, 2007.

Office Action dated Mar. 31, 2011, U.S. Appl. No. 11/746,273, filed May 9, 2007.

Office Action dated Apr. 3, 2009, U.S. Appl. No. 11/838,175, filed Aug. 13, 2007.

Final Office Action dated Nov. 24, 2009, U.S. Appl. No. 11/838,175, filed Aug. 13, 2007.

Advisory Action dated Mar. 24, 2010, U.S. Appl. No. 11/838,175, filed Aug. 13, 2007.

Notice of Allowance dated Aug. 2, 2010, U.S. Appl. No. 11/838,175, filed Aug. 13, 2007.

Office Action—First Action Interview Pilot Program Pre-Interview Communication dated Apr. 2, 2010, U.S. Appl. No. 12/036,289, filed Feb. 24, 2008.

Notice of Allowance dated Jul. 26, 2010, U.S. Appl. No. 12/036,289, filed Feb. 24, 2008.

Notice of Allowance dated Oct. 15, 2010, U.S. Appl. No. 12/273,537, filed Nov. 18, 2008.

Supplemental Notice of Allowance dated Nov. 12, 2010, U.S. Appl. No. 12/273,537, filed Nov. 18, 2008.

Supplemental Notice of Allowance dated Jan. 10, 2011, U.S. Appl. No. 12/273,537, filed Nov. 18, 2008.

Office Action dated Nov. 1, 2011, U.S. Appl. No. 11/746,273, filed May 9, 2007.

* cited by examiner

| H 302 | Circuit Identifier 304 | Product 306 | Speed 308 | IP Address 310 | Street 312 | City 314 | State 316 | Status 318 | Details 320 |
|---|---|---|---|---|---|---|---|---|---|
| + | 12345678900 | Global MPLS | 56 kbps | | 1022 M. St. SE | Newark | DE | Operational | Details |
| − | 12345678901 | SprintLinkATM | 4xT-1 | | 135 N. Penn St. | Newark | DE | Operational | Details |
| | 12345678902 | | T-1 | | | | | Operational | Details |
| | 12345678903 | | T-1 | | | | | Operational | Details |
| | 12345678904 | | T-1 | | | | | Operational | Details |
| | 12345678905 | | T-1 | | | | | Operational | Details |
| + | 12345678906 | Dedicated IP | T-1 | 144.19.144.5 | 1680 K. St. NW | Newark | DE | Operational | Details |
| − | 12345678907 | Global MPLS | T-1 | 171.05.95.144 | 8180 Upland Cir. | Reston | VA | Operational | Details |
| | VRF Name DLCI | Type | | | | | | | |
| | V608:check4 Voice31 | | | 171.09.0.171 | | | | | Details |
| | V604:check4 Data30 | | | 171.09.0.095 | | | | | Details |
| + | 12345678908 | Global MPLS | 56 kbps | | 1 Boxridge Dr. | Plano | TX | Operational | Details |
| − | 12345678909 | Global MPLS | 2xT-1 | | 101 Wolf Dr. | Plano | TX | Operational | Details |
| | VRF Name DLCI | Type | | | | | | | |
| | V608:check4 Voice31 | Logical Port | | 171.09.0.019 | | | | | Details |
| | V604:check4 Data30 | Logical Port | | | | | | | Details |
| | 12345678910 | Physical Port | T-1 | | | | | Operational | Details |
| | 12345678911 | Physical Port | T-1 | 171.09.0.9 | | | | Operational | Details |
| + | 12345678912 | Dedicated IP | T-1 | 144.95.171.9 | 947 Newhall | Plano | TX | Operational | Details |

Fig. 3

SERVICE GROUPING FOR NETWORK REPORTING

CROSS-REFERENCE TO RELATED APPLICATIONS

This application includes subject matter related to the following patents, which are hereby incorporated by reference: U.S. Pat. No. 7,940,533, issued Mar. 8, 2011, entitled "Integrated Network and Customer Database," by Jose Gonzalez, et al.; U.S. Pat. No. 7,751,392, issued Jul. 6, 2010, entitled "Customer Link Diversity Monitoring," by Jose Gonzalez, et al.; U.S. Pat. No. 7,830,816, issued Nov. 9, 2010, entitled "Network Access and Quality of Service Troubleshooting," by Jose Gonzalez, et al.; and U.S. Pat. No. 7,831,709, issued Nov. 9, 2010, entitled "Flexible Grouping for Port Analysis," by David M. Ham, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network service provider may monitor the status of network devices through a network monitoring system that includes network data for network devices. A customer may use computers at a specific location for a specific purpose, such as communicating with the customer's other sales centers and distribution centers. The network monitoring system may not have customer data that would readily enable a technician or a customer to monitor the operation of network devices that provide service to the customer or to evaluate the effect of the network devices on communication with the customer's other sales centers and distribution centers.

SUMMARY

In some embodiments, a system is provided for service grouping in network reporting. The system includes a data retriever, a data analysis tool, and a user interface, each stored in a memory, and a processor. When executed by the processor, the data retriever retrieves router configuration data from data stores for routers in a service provider network. When executed by the processor, the data analysis tool parses the router configuration data to create port data for each port on each router in the service provider network and integrates the port data with customer data to create an integrated database. The data analysis tool also identifies ports associated with a customer, identifies the ports associated with the customer which are bundled into bundled logical ports, and identifies the ports associated with the customer which are partitioned into partitioned logical ports. Additionally, the data analysis tool creates a hierarchy of port information based on the ports associated with the customer, the bundled logical ports, the partitioned logical ports, and a service provided to the customer. When executed by the processor, the user interface displays the hierarchy of port information to enable the customer to troubleshoot ports.

In some embodiments, a computer implemented method is provided for service grouping in network reporting. A data analysis tool stored in a memory and executed by a processor parses router configuration data to create port data for each port on each router in a service provider network. The data analysis tool integrates the port data with customer data to create an integrated database. The data analysis tool identifies ports associated with a customer. The data analysis tool identifies ports associated with the customer which are bundled into bundled logical ports. The data analysis tool identifies ports associated with the customer which are partitioned into partitioned logical ports. The data analysis tool creates a hierarchy of port information based on the ports associated with the customer, the bundled logical ports, the partitioned logical ports, and a service provided to the customer. The hierarchy of port information is displayed via a user interface stored in a memory and executed by a processor to enable the customer to troubleshoot ports.

In some embodiments, a system is provided for service grouping in network reporting. The system includes a data retriever, a data analysis tool, and a user interface, each stored in a memory, and a processor. When executed by the processor, the data retriever retrieves router configuration data from data stores for routers in a service provider network. When executed by the processor, the data analysis tool parses the router configuration data to create port data for each port on each router in the service provider network and integrates the port data with customer data to create an integrated database. The data analysis tool also identifies ports associated with a customer, identifies the ports associated with the customer which are bundled into bundled logical ports, and identifies the ports associated with the customer which are partitioned into partitioned logical ports. Additionally, the data analysis tool creates a hierarchy of port information based on the ports associated with the customer, the bundled logical ports, the partitioned logical ports, a service provided to the customer, and a geographical location associated with the service. When executed by the processor, the user interface displays the hierarchy of port information to enable the customer to troubleshoot ports.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 shows a frame of a graphical user interface for service grouping in network reporting according to some embodiments of the present disclosure.

DETAILED DESCRIPTION

Figure 1:
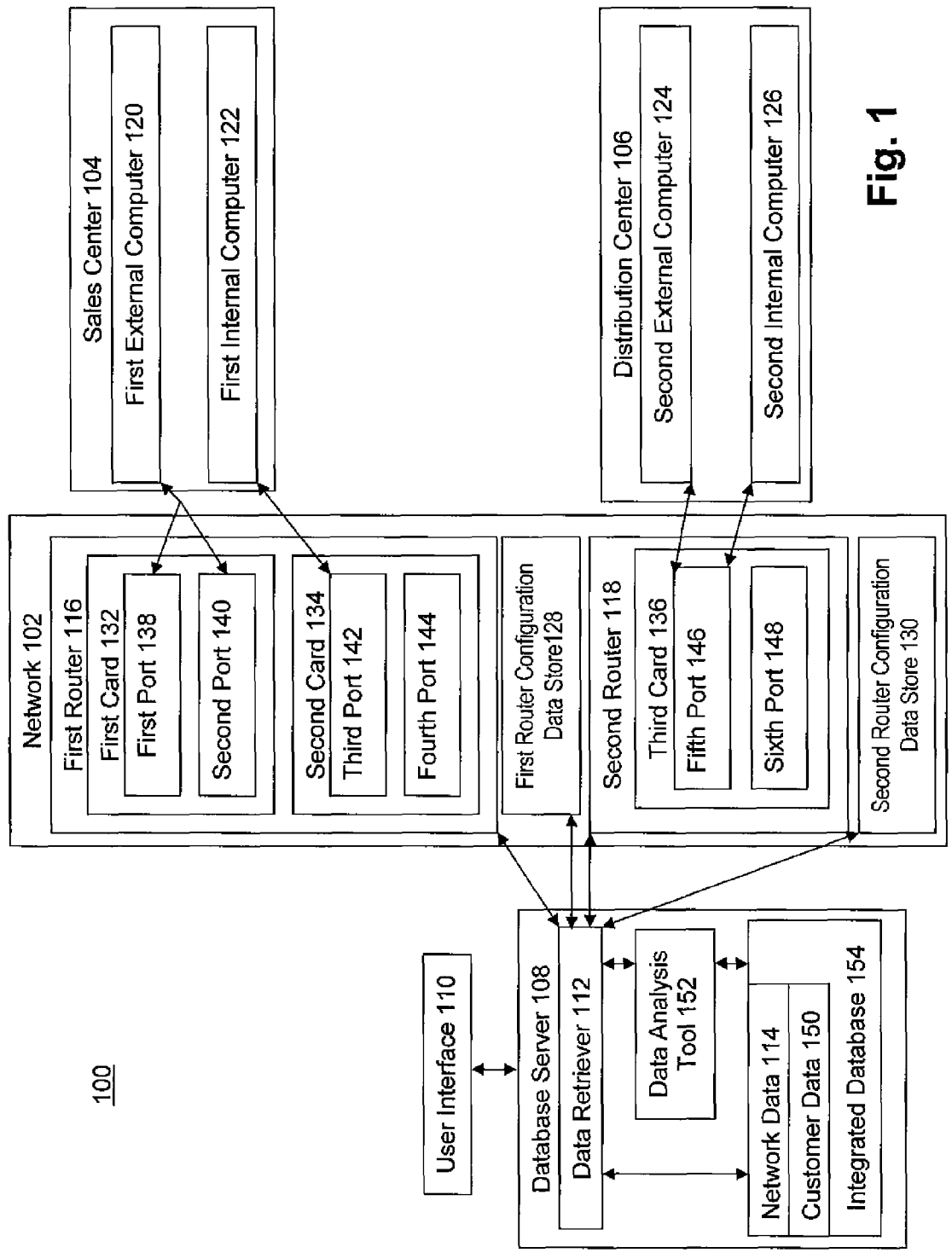
FIG. 1 is a block diagram of an illustrative system for service grouping in network reporting according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A monitoring system providing service grouping in network reporting is provided to enable a customer to monitor the service provider network based on service groupings of customer links. A port is the physical interface between a router and a circuit or cable. A customer link is the collection of all the circuits and ports that are between two end points that enable communication between those end points. For many instances, a customer link comprises a single circuit and a single port. However, some network services may bundle two or more smaller circuits to create a larger virtual circuit. These bundles may be associated with two or more ports. All of the ports providing a bundled service may be located on the same router card. The monitoring system determines which ports provide a bundled service and treats those ports accordingly. The monitoring system also allocates every port into customer links.

The monitoring system retrieves router configuration data to create an integrated database. The monitoring system accesses network information in router configuration data stores instead of directly accessing routers, thus eliminating the possibility of interfering with router operation. After the monitoring system retrieves the network information from the router configuration data stores, the system integrates the network information with customer information to create an integrated database for subsequent access.

A data analysis tool identifies ports associated with a customer, identifies the ports associated with the customer which are bundled into bundled logical ports, and identifies the ports associated with the customer which are partitioned into partitioned logical ports. For example, the data analysis tool may identify that a customer purchased services supported by three physical ports. Each of the first two physical ports provides the capability for a data service to communicate at 1.5 megabits per second, and may be bundled as a first service grouping into a bundled logical port that provides the capability for a high-speed data service to communicate at 3.0 megabits per second. The third physical port may be partitioned as a second service grouping into two partitioned logical ports, with one of the partitioned logical ports enabling internal network communication and the other partitioned logical port enabling external Internet access. The data analysis tool creates a hierarchy of port information based on the ports associated with the customer, the bundled logical ports, the partitioned logical ports, and a service provided to the customer. Based on the service groupings derived from the configurations of the ports, the hierarchy of port information may depict logical ports and physical ports at a primary level of port information presented to the customer and depict logical ports and physical ports at a secondary level of port information presented to the customer. For example, the hierarchy of port information depicts the bundled logical port of the first service grouping and the partitioned logical ports of the second service grouping as the primary level of port information presented to the customer and the unbundled physical ports of the first service grouping and the partitioned physical port of the second service grouping as a secondary level of port information presented to the customer.

A user interface displays the hierarchy of port information to enable the customer to troubleshoot ports. For example, the customer purchased a high-speed data service that may communicate at 3.0 megabits per second, an internal network connection, and an external Internet connection. A customer may use the user interface to view port information, but displaying the information associated with the three physical ports that provide the customer's services may cause customer confusion due to the customer's expectations of viewing a high-speed data service, an internal network connection, and an external Internet connection. Instead, the user interface displays information associated with the logical ports and the supporting physical ports that provide the customer services in a manner that matches the customer's expectations. In this example, if the customer experiences changes in the high-speed data service, the customer may view the primary level of port information to identify a potential problem with a logical port, and select to view port information associated with any physical ports that support the logical port in question. If the customer identifies that one of the physical ports that provides the capability for a data service to communicate at 1.5 megabits per second is down, the customer can better report the problem to a customer service technician. The hierarchy of port information not only presents port information to the customer based on the customer's expectations, but also enables the customer to troubleshoot logical and physical ports whenever customer service is impacted.

Turning now to FIG. 1, a monitoring system 100 providing service grouping in network reporting is depicted. The numbers of each type of component in the system 100 are depicted in FIG. 1 for the purpose of illustration, but the system 100 may include any number of each component type. The system 100 includes a network 102, a sales center 104, a distribution center 106, a database server 108, and a user interface 110. The network 102 enables communications for the centers 104-106. Although described as the sales center 104 and the distribution center 106, the centers 104-106 may be any type of centers 104-106. The database server 108 monitors communications by the centers 104-106 on the network 102. The user interface 110 enables a user to interface with the database server 108.

The database server 108 stores data retrieved by a data retriever 112 that accesses the network 102. The data retriever 112 retrieves network data 114 from network devices, such as a first router 116 and a second router 118 that communicate as part of the network 102. The network data 114 may include data that identifies which routers, cards, and ports are connected to which customers at which locations. The network 102 may include thousands of routers 116-118 for routing messages between computers. Each router 116-118 forwards data packets across the network 102 toward their destinations. For example, the first router 116 sends and receives data packets for a first external computer 120 and a first internal computer 122 at the sales center 104; and the second router 118 sends and receives data packets for a second external computer 124 and a second internal computer 126 at the distribution center 106.

The sales center 104 may use the first external computer 120 to communicate with external customer computers over an external network, such as the Internet. The sales center 104 may use the first internal computer 122 to communicate in a customer network with other internal customer computers, such as the second internal computer 126 at the distribution center 106. The distribution center 106 may use the second external computer 124 to communicate with external customer computers over an external network, such as the Internet. The distribution center 106 may use the second internal computer 126 to communicate in the customer network with other internal customer computers, such as the first internal computer 122 at the sales center 104. The network data 114 may include data for multiple networks 102, with each network 102 including any number of routers 116-118 and data for each of the routers 116-118. The network data 114 may be compiled from router configuration data that is stored off-line in a data store as a recovery file to enable a router to recover after power outages or router maintenance. The router configuration data may include which customer computer is linked to which port on which card for which router. The router configuration data for the first router 116 may be stored in a file in non-volatile memory in a first router configuration data store 128. The first router configuration data store 128 may be a backup data store associated with or on board the first router 116. Similarly, the router configuration data for the second router 118 may be stored in a file in non-volatile memory in a second router configuration data store 130. By accessing router configuration data in the first router configuration data store 128 and the second router configuration data store 130, the data retriever 112 has the option of not directly accessing the first router 116 or the second router 118. Not directly accessing routers reduces the possibility of interfering with router operation. The on-line routers 116-118 may store their router configuration data in the off-line backup data stores 128-130 periodically, such as each day when throughput is low. The network data 114 may alternatively be in part compiled from the router configuration data that is used by the routers 116-118.

The first router 116 includes a first card 132 and a second card 134, and the second router 118 includes a third card 136. Each card 132-136 may include multiple ports that each link with a customer computer. For example, the first card 132 includes a first port 138 and a second port 140, the second card 134 includes a third port 142 and a fourth port 144, and the third card 136 includes a fifth port 146 and a sixth port 148. One customer may have multiple customer computers that link to the network 102 through the routers 116-118. The sales center 104 for the customer includes the first external computer 120 linked to both the first port 138 and the second port 140 on the first card 132 on the first router 116, and the first internal computer 122 linked to the third port 142 on the second card 134 on the first router 116. Additionally, the distribution center 106 for the customer includes the second external computer 124 linked to the fifth port 146 on the third card 136 on the second router 118 and the second internal computer 126 also linked to the fifth port 146 on the third card 136 on the second router 118. The database server 108 stores the network data 114 separate from customer data 150, which may be entered from the user interface 110.

The database server 104 includes a data analysis tool 152 that integrates the network data 114 with the customer data 150 to create an integrated database 154. The network data 114 includes the port data for the individual ports 138-148. The data analysis tool 152 may receive input from a user through the user interface 110 and display the network data 114 and the customer data 150 from the integrated database 154 on the user interface 110. The data retriever 112 retrieves the network data 114 from the network 102 to provide to the data analysis tool 152 to store in the integrated database 154. Although depicted as retrieving the network data 114 from only one network, the network 102, the data retriever 112 may retrieve the network data 114 from any number of networks 102. Likewise, the data analysis tool 152 may integrate the network data 114 from any number of networks 102 with the customer data 150 to create the integrated database 154.

The data analysis tool 152 identifies the ports associated with a customer, identifies the ports associated with the customer which are bundled into bundled logical ports, and identifies the ports associated with the customer which are partitioned into partitioned logical ports. For example, the data analysis tool 152 may identify that a customer purchased services supported by four physical ports 138, 140, 142, and 146. The services may be a voice communication service, a data communication service, a frame relay service, and/or an asynchronous transfer mode service.

For example, each of the physical ports 138 and 140 that provide the capability for a data service to communicate at 1.5 megabits per second may be bundled into a bundled logical port that provides the capability for a high-speed data service to communicate at 3.0 megabits per second for a data service. The data analysis tool 152 may combine information associated with the ports which are bundled into the bundled logical ports to create information associated with the bundled logical ports. For example, the data analysis tool 152 combines information associated with the ports 138 and 140 to create information associated with the bundled logical port for the first external computer 120.

The physical port 146 may be partitioned into two partitioned logical ports, with one of the partitioned logical ports enabling internal network communication for the second internal computer 126 and the other partitioned logical port enabling external Internet access for the second external computer 124. The partitioned logical ports may be separated by a firewall that enables the physical port 146 to provide two different services to the computers 124 and 126. The data analysis tool 152 may divide information associated with the ports which are partitioned into partitioned logical ports to create information associated with each of the partitioned logical ports. For example, the data analysis tool 152 divides information associated with the physical port 146 to create information associated with each of the partitioned logical ports for the computers 124 and 126.

The data analysis tool 152 creates a hierarchy of port information based on the ports associated with the customer, the bundled logical ports, the partitioned logical ports, and a service provided to the customer. For example, the hierarchy of port information depicts the bundled logical port and the partitioned logical ports as the primary level of port information presented to the customer and depicts the port 142, the unbundled physical ports 138 and 140, and the partitioned physical port 146 as a secondary level of port information presented to the customer.

The hierarchy of port information may include a parent port that is associated with a child port. The data analysis tool 152 may determine parent ports and child ports based on applying a set of rules to the customer's ports and the customer service groupings derived from the configurations of a customer's ports. The data analysis tool 152 also may display port information via the user interface 110 to enable a user to determine the parent ports and the child ports based on the customer's ports and the customer services provided by the customer's ports. For example, the data analysis tool 152 creates a hierarchy of port information that depicts the bundled logical port that provides the capability to communicate at 3.0 megabits per second for a data service as a parent port at the primary level of port information presented to the customer. When the customer selects to view more information associated with this parent port, the hierarchy of port information depicts each of the unbundled physical ports 138 and 140 that provide the capability to communicate at 1.5 megabits per second as the child ports at a secondary level of port information presented to the customer. The customer may initially view the bundled logical port for the data service that communicates at 3.0 megabits per second as a parent port at the primary level of port information.

The hierarchy of port information may include information associated with an internet protocol address, a product, a characteristic, a bandwidth allocation, and/or an operational detail. For example, the customer may view the primary level of port information and notice that an operational detail indicates that the bundled logical port is communicating at significantly less than 3.0 megabits per second even though the bandwidth allocation for this port is for 3.0 megabits per second.

In response to noticing this operational detail, the customer may select for the bundled logical port to display the child ports of this parent port. If the customer views the secondary level of port information that displays the child ports of the selected parent port, the customer may notice that the unbundled physical port 138 is communicating at significantly less than 1.5 megabits per second, which may be the cause for the bundled logical port communicating at significantly less than 3.0 megabits per second.

The hierarchy of port information may include a history of information associated with the operational detail. For example, the operational detail for the unbundled physical port 138 may indicate that the port 138 was communicating at 1.5 megabits per second during a first time period, communicating at 1.0 megabits per second during a second time period, and communicating at 0.5 megabits per second during a third time period. Viewing the history of this operational detail may enable a customer to detect trends or patterns in their customer service. Depicting the hierarchy of port information as relationships between parent ports and child ports in the hierarchy of port information may enable a customer to examine a high level overview of customer services and detect problems with ports before the problems become more serious.

The hierarchy of port information may include a first peer port that relates to a second peer port based on the service provided to the customer. For example, a first peer port may be a port associated with inbound communications for a gateway and a second peer port may be a port associated with outbound communications for the gateway. The hierarchy of port information may depict one of the peer ports as a parent port at the primary level of port information and the other peer port as a child port at the secondary level of port information. The customer may view one of the peer ports as a parent port at the primary level of port information, and the customer may select for the peer port to display the child port of this parent port. In response to this selection of the parent port, the customer may view the secondary level of port information that displays the other peer port as a child port of the selected parent port. Based on the service groupings derived from the configurations of the ports, the hierarchy of port information may depict logical ports and physical ports at the primary level of port information presented to the customer and depict logical ports and physical ports at the secondary level of port information presented to the customer.

The user interface 110 displays the hierarchy of port information to enable the customer to troubleshoot ports. For example, the customer purchased a connection that may communicate at 3.0 megabits per second and an internal network connection that may communicate at 1.5 megabits per second for the sales center 104, and purchased both an internal network connection and an external Internet connection that each may communicate at 0.75 megabits per second for the distribution center 106. Rather than displaying the information associated with the four physical ports 138, 140, 142, and 146 that provide the customer's services, which may not match the customer's expectations and may cause customer confusion, the user interface 110 displays information associated with the two logical ports and the four supporting physical ports that provide the customer services in a manner that matches the customer's expectations.

The user interface 110 initially may display only a portion of the ports associated with the customer, the bundled logical ports, and the partitioned logical ports. The user interface 110 may respond to a selection to view more information by displaying a previously un-displayed port of the ports associated with the customer, the bundled logical ports, and the partitioned logical ports. For example, the user interface 110 initially displays the bundled logical port that provides the capability to communicate at 3.0 megabits per second for a data service as a parent port at the primary level of port information presented to the customer, but does not initially display the unbundled physical ports 138 and 140 that are the child ports for the bundled logical port that serves as their parent port. When the customer selects to view more information associated with this parent port, the user interface 110 displays each of the unbundled physical ports 138 and 140 that provide the capability to communicate at 1.5 megabits per second as the child ports at a secondary level of port information presented to the customer. When the user interface 110 displays the unbundled physical ports 138 and 140 as the child ports, the user interface 110 may either continue displaying the parent port or discontinue displaying the parent port.

The user interface 110 may display a port as duplicate ports. For example, the customer purchased an internal network connection that may communicate at 0.75 megabits per second for the second internal computer 126 at the distribution center 106 and an external Internet connection that may communicate at 0.75 megabits per second for the second external computer 124 at the distribution center 106. To support the purchased customer services, the network service provider partitioned the fifth port 146 that may communicate at 1.5 megabits per second into two partitioned logical ports that each may communicate at 0.75 megabits per second to provide an internal network connection and an external Internet connection at the distribution center 106. The hierarchy of port information may depict the two partitioned logical ports that provide the internal network connection and the external Internet connection as parent ports at the primary level of port information presented to the customer. If the customer selects to view more information associated with the first partitioned logical port that provides the internal network connection, the user interface 110 may display the fifth port 146 that may communicate at 1.5 megabits per second as the child port of the first partitioned logical port that may communicate at 0.75 megabits per second. If the customer selects to view more information associated with the second partitioned logical port that provides the external network connection, the user interface 110 may display the fifth port 146 that may communicate at 1.5 megabits per second as the child port of the second partitioned logical port that may communicate at 0.75 megabits per second. If the customer selects to view more information associated with both the first partitioned logical port that provides the internal network connection and the second partitioned logical port that provides the external network connection, the user interface 110 may display the fifth port 146 that may communicate at 1.5 megabits per second as the child port of both the first partitioned logical port and the second partitioned logical port that each may communicate at 0.75 megabits per second. In this situation, the user interface 110 displays the fifth port 146 twice in the same hierarchy of port information. Although data management rules tend to prohibit displaying duplicate information, the user interface 110 may display some ports as duplicate ports to enable customers to understand the relationship between the logical ports and the physical ports that provide their customer service.

If the customer experiences changes in customer service, the customer may use the user interface 110 to view the primary level of port information to identify a potential problem with a logical port and select to view port information associated with any physical ports that support the logical port in question. The hierarchy of port information not only presents port information to the customer based on the customer's expectations, but also enables the customer to troubleshoot logical and physical ports whenever customer service is impacted. If the customer views the hierarchy of port information and detects a port problem, the customer may generate a trouble ticket for failed ports or request the network service provider to generate the trouble ticket.

Figure 2:
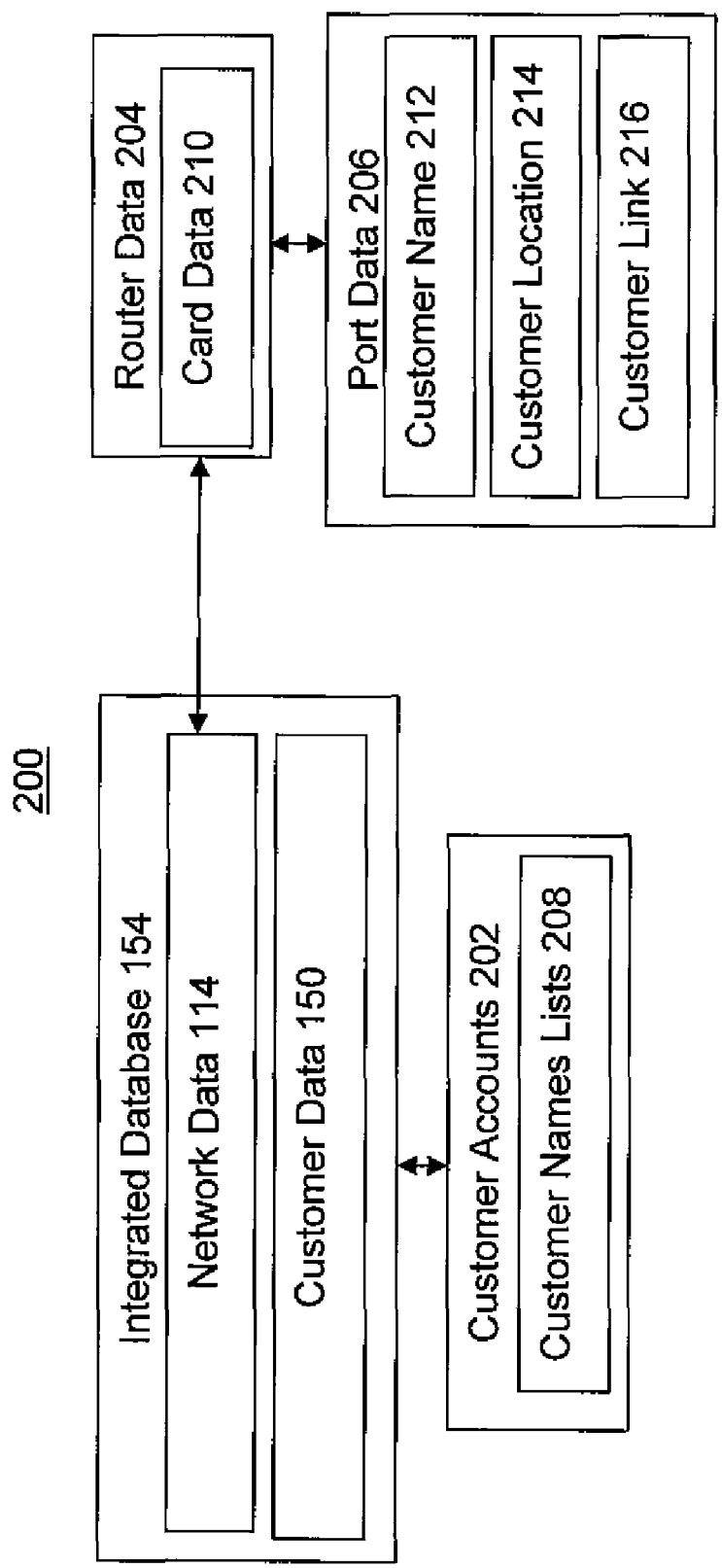
FIG. 2 shows a schema for an integrated database for service grouping in network reporting according to some embodiments of the present disclosure.

Turning now to FIG. 2, a schema 200 for the integrated database 154 for service grouping in network reporting is depicted according to some embodiments of the present disclosure. The schema 200 includes the integrated database 154, customer accounts 202, router data 204, and port data 206. The integrated database 154 includes the network data 114 and the customer data 150. The customer data 150 is related to the customer accounts 202, which may be a customer database that includes business information, such as billing plans, billing information, and customer names lists 208.

Each of the customer names lists 208 includes a list of one or more customer names used by a specific customer. For example, "Great Gadgets Corporation," "Great Gadgets Corp.," "Great Gadgets," and "Great Corp." may be customer names used by the customer Great Gadgets Corporation. In contrast, "Great Games Company" is a customer name used by a customer that is unrelated to Great Gadgets Corporation. The integrated database 154 uses the customer names lists 208 to integrate the network data 114 with the corresponding customer in the customer data 150. For example, the network data 114 for "Great Gadgets Corporation," "Great Gadgets Corp.," "Great Gadgets," and "Great Corp." are integrated with the customer data 150 for the customer Great Gadgets Corporation, but the network data 114 for "Great Games" is integrated with the customer data 150 for a different customer. The integrated database 154 may present customer names from the customer names lists 208 to a user through the user interface 110 to enable the user to select which customer names in the customer names lists 208 correspond to which customers.

The network data 114 includes router data 204, which includes network information, such as card data 210 for a specific router. The network data 114 may include data for multiple networks, with each network including any number of routers and data for each of the routers. The router data 204 may be based on router configuration data that is stored offline in a data store as a recovery file to enable a router to recover after power outages or router maintenance.

The router data 204 includes the card data 210, and the card data 210 includes the port data 206, which may include connectivity information that specifies which specific ports located on specific cards are connected to which customer locations. The data retriever 112 retrieves the router data 204, which the database server 108 parses to determine the card data 210 and the port data 206 related to the card data 210. Only one instance of the port data 206 is depicted for the purpose of illustration, but each card may include multiple ports and the card data 210 may be related to instances of the port data 206 for each port.

The port data 206 includes a customer name 212, a customer location 214, and a customer link 216. The port data 206 may also include customer bandwidth, status, configuration, and data output. The integrated database 154 uses the customer name 212 for a specific port with the customer names lists 208 to determine to which customer the specific port corresponds. By determining which specific ports correspond to which customers, the database server 108 may respond to a selection through the user interface 110 to view more information associated with a specific service group of customer ports by displaying the port data 206 for each port that corresponds to the specific customer service group.

The customer location 214 may include a geographic location for a specific router, such as New York, Chicago, or Atlanta. The customer location 214 also may include the street address for a customer linked to a specific router. By relating the customer location 214 for each router to a customer, the integrated database 154 may display the router data 204 for each router related to the customer that is at a general or specific location selected through the user interface 110. For example, if a user requests to view port information for ports that identify Atlanta as a general location and Great Gadgets Corporation as a customer, the integrated database 154 displays the router data 204 for each of Great Gadgets Corporation's routers that are located in Atlanta.

In yet another example, parsing the router data 204 may determine the port data 206 that specifies the customer name 212 for a port is "Great Corp." and the customer link is between the first external computer 120 at the sales center 104 and both the first port 138 and the second port 140 on the first card 132 on the first router 116. As a further example, parsing the router data 204 may determine the customer location 214 that specifies Chicago as the geographic location for the router that contains the port and the customer link is between the first internal computer 122 at the sales center 104 and the third port 142 on the second card 134 on the first router 116. In an additional example, the port data 206 related to the network data 114 specifies that the customer name 212 for the first port 138 is "Great Corp.," and the port data 206 related to the network data 114 specifies that the customer name 212 for the second port 140 is "Great Corp." For this example, the database server 108 integrates the port data 206 for the first port 138 and the port data 206 for the second port 140 with the customer data 150 for Great Gadgets Corporation. The database server 108 stores this integrated network data 114 and customer data 150 in the integrated database 154. The integrated database 154 may include network data 114 that is both current and historical data. Because a customer may communicate through multiple networks from the same location, the integrated database 154 may display the name of the corresponding network along with the router data 204 for each router.

FIG. 3 shows a frame 300 of a graphical user interface for service grouping in network reporting according to some embodiments of the present disclosure. The numbers and types of each element in FIG. 3 are depicted for the purpose of an illustrative example, as the frame 300 may include any number and type of elements. Additionally, the graphic user interface may contain other frames and control elements. The database server 108 may provide the frame 300 via the user interface 110 to enable a user to troubleshoot ports. The frame 300 depicts a hierarchy of port information that includes a H 302 column, a circuit identifier column 304, a product column 306, a speed column 308, an IP address column 310, a street column 312, a city column 314, a state column 316, a status column 318, a details column 320, and rows 322 that correspond to each of the columns 302-320. The rows 322 include rows 324 of information for ports in Delaware, rows 326 of information for ports in Virginia, and rows 328 of information for ports in Texas.

The H column 302 list the hierarchy position for corresponding ports, such as a "+" for a parent port which does not have its child ports currently displayed, a "−" for a parent port which has its child ports currently displayed, and a "−" for child ports that are currently displayed. The circuit identifier column 304 displays the identifier for the circuit for a corresponding port. When a parent port is selected to view more information, the circuit identifier column 304 may display the virtual private network routing and forwarding technology identifier and the data link connection identifier for corresponding child ports in a virtual private network. The product column 306 displays products that provide customer service for corresponding ports. When a parent port is selected to view more information, the product column 306 may display whether a corresponding child port is a logical port or a physical port. The speed column 308 displays allocated bandwidth for corresponding ports. When a parent port is selected to view more information, the speed column 308 may display allocated bandwidth for corresponding child ports. The IP address column 310 displays the internet protocol address for corresponding ports. When a parent port is selected to view more information, the IP address column 310 may display the internet protocol address for corresponding child ports.

The street column 312 displays the physical street address, such as 8180 Upland Cir., associated with corresponding ports. The city column 314 displays the city, such as Newark, associated with corresponding ports. The state column 316 displays the state, such as Texas, associated with corresponding ports. The status column 318 displays whether a corresponding port is operational or not. The details column 320 displays operational details for a corresponding port, such as a current rate of communication.

The rows 324 display the hierarchy of port information for the customer's ports in the state of Delaware. In this example, the rows 324 initially displayed information for three parent ports that were each labeled with a "+" sign. When the customer selected to view more information associated with the second of the three parent ports, the "+" sign for the second parent port changed to a "−" sign and the frame 300 displayed information for the four child ports for the selected parent port. If the customer selects to view less information associated with the second of the three parent ports again, the "−" sign for the second parent port changes to a "+" sign and the frame 300 no longer displays information for the four child ports for the selected parent port. In this example, the selected parent port is a bundled logical port that provides a communication speed that is equivalent to four T−1 lines, which are also known as digital signal 1 lines. Continuing this example, the four displayed child ports are physical ports that each provides a T−1 line. If the customer notices a change in service for the bundled logical port that serves as the parent port for the four physical ports, the customer may select to view the details 320 of the parent port, select the parent port to view the four child ports, and select to view the details 320 for each of the physical ports that are the child ports of the bundled logical port.

The rows 326 display the hierarchy of port information for the customer's ports in the state of Virginia. In this example, the rows 326 initially displayed information for one parent port that was labeled with a "+" sign. When the customer selected to view more information associated with the parent port, the "+" sign for the parent port changed to a "−" sign and the frame 300 displayed information for the two child ports for the selected parent port. If the customer selects to view less information associated with the parent port again, the "−" sign for the parent port changes to a "+" sign and the frame 300 no longer displays information for the two child ports for the selected parent port. In this example, the parent port is a physical port that is partitioned into two logical partitioned ports to provide both voice and data communication for the customer's location in Virginia. Continuing this example, the two displayed child ports are the logical partitioned ports for voice and data communications. If the customer notices a change in service for the physical port that serves as the parent port for the two partitioned logical ports, the customer may select to view the details 320 of the parent port, select the parent port to view the two child ports, and select to view the details 320 for each of the partitioned logical ports that are the child ports of the physical port.

The rows 328 display the hierarchy of port information for the customer's ports in the state of Texas. In this example, the rows 328 initially displayed information for three parent ports that were each labeled with a "+" sign. When the customer selected to view more information associated with the second of the three parent ports, the "+" sign for the second parent port changed to a "−" sign and the frame 300 displayed information for the four child ports for the selected parent port. If the customer selects to view less information associated with the second of the three parent ports again, the "−" sign for the second parent port changes to a "+" sign and the frame 300 no longer displays information for the four child ports for the selected parent port. In this example, the selected parent port is a bundled logical port that provides a communication speed that is equivalent to two T−1 lines. Continuing this example, the four displayed child ports are two physical ports that each provides a T−1 line and two partitioned logical ports that provide voice communication and data communication. If the customer notices a change in service for the bundled logical port that serves as the parent port for the two physical ports and the two logical ports, the customer may select to view the details 320 of the parent port, select the parent port to view the four child ports, and select to view the details 320 for each of the physical ports and logical ports that are the child ports of the bundled logical port.

Figure 4:
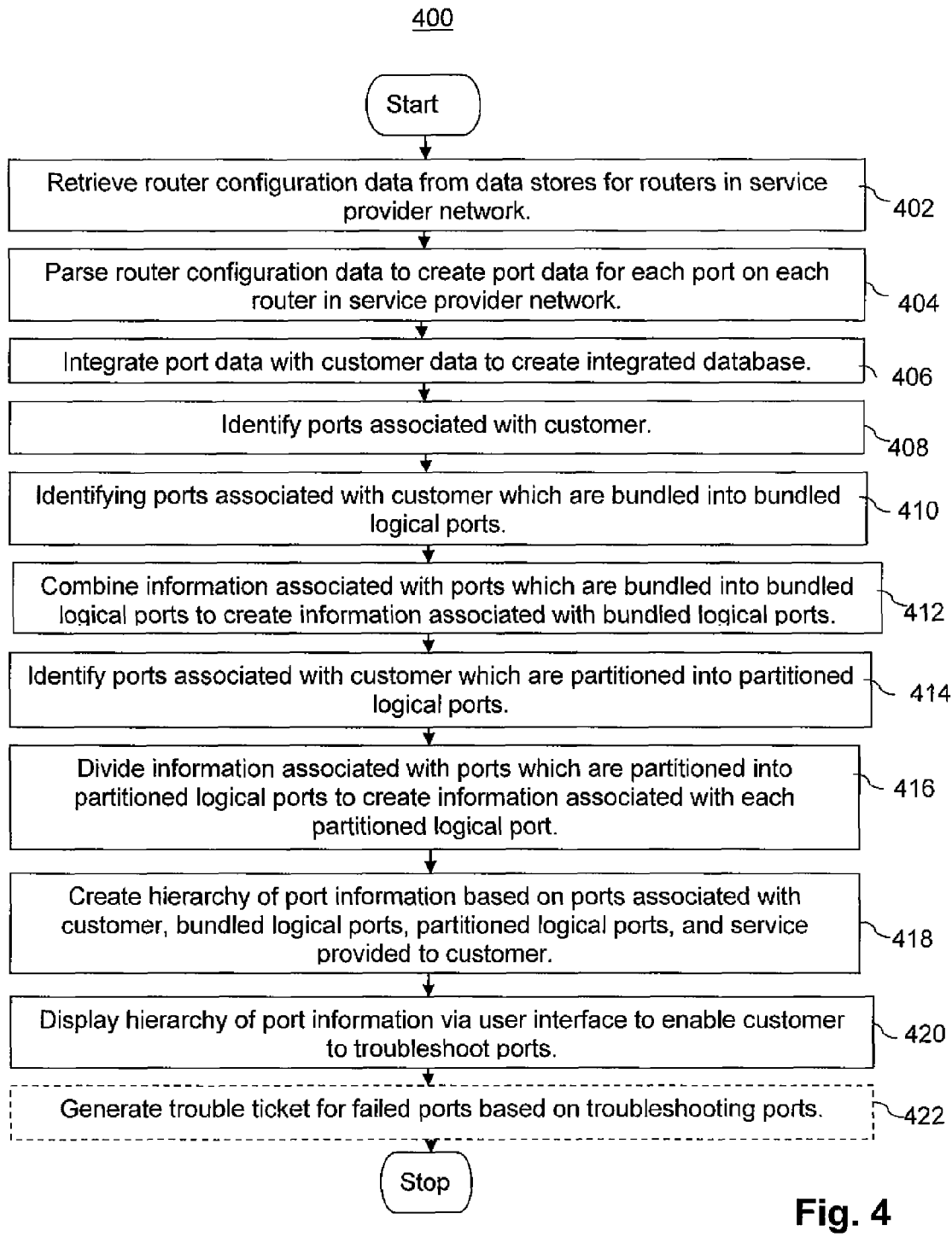
FIG. 4 shows a method for service grouping in network reporting according to some embodiments of the present disclosure.

Turning now to FIG. 4, a method 400 for service grouping in network reporting is depicted according to some embodiments of the present disclosure. Executing the method 400 results in creating a database of port data and customer data, identifying physical ports and logical ports associated with a customer, creating a hierarchy of port information based on the logical ports and the physical ports, and displaying the hierarchy of port information to enable a customer to troubleshoot ports.

In box 402, router configuration data is retrieved from data stores for routers in a service provider network. For example, the data retriever 112 retrieves the router configuration data from the router configuration data stores 128-130 so that the on-line routers are not directly accessed during normal operations.

In box 404, router configuration data is parsed to determine port data for each port on each router in a service provider network. For example, the data retriever 112 retrieves the router data 204 and the database server 108 parses the router data 204 to determine the port data 206 for each port on each router. In another example, the data retriever 112 retrieves the router data 204 and parses the router data 204 to determine the port data 206 for each port on each router.

In box 406, port data is integrated with customer data to create an integrated database. For example, the database server 108 uses the customer name 212 for each port on each router in combination with the customer names lists 208 to integrate the customer data 150 with the network data 114, which includes the port data 206, to create the integrated database 154.

In box 408, ports associated with a customer are identified. For example, the data analysis tool 152 identifies the ports 138-148 associated with a customer.

In box 410, ports associated with a customer which are bundled into bundled logical ports are identified. For example, the data analysis tool 152 identifies the ports 138 and 140 which are bundled into a bundled logical port for the first external computer 120.

In box 412, information associated with ports which are bundled into bundled logical ports is combined to create information associated with bundled logical ports. For example, the data analysis tool 152 combines information associated with the ports 138 and 140 to create information associated with the bundled logical port for the first external computer 120.

In box 414, ports which are partitioned into partitioned logical ports are identified. For example, the data analysis tool 152 identifies the port 146 which is partitioned into partitioned logical ports for the second external computer 124 and the second internal computer 126.

In box 416, information associated with ports which are partitioned into partitioned logical ports is divided to create information associated with each partitioned logical port. For example, the data analysis tool 152 divides information associated with the port 146 to create information associated with the partitioned logical ports for the second external computer 124 and the second internal computer 126.

In box 418, a hierarchy of port information is created based on ports associated with a customer, bundled logical ports, partitioned logical ports, and service provided to the customer. For example, the data analysis tool 152 creates a hierarchy of port information based on the ports 138-148, the bundled logical port for the first external computer 120, the partitioned logical ports for the second external computer 124 and the second internal computer 126, and the services provided to the customer.

In box 420, a hierarchy of port information is displayed via a user interface to enable a customer to troubleshoot ports. For example, the user interface 110 displays the frame 300 to enable the customer to troubleshoot ports.

In box 422, a trouble ticket is optionally generated for failed ports based on troubleshooting ports. For example, the user interface 110 generates a trouble ticket for failed ports based on the customer detecting that the unbundled physical port 138 is currently communicating at 0.0 megabits per second with a flag that indicates that the unbundled physical port 138 is down.

Figure 5:
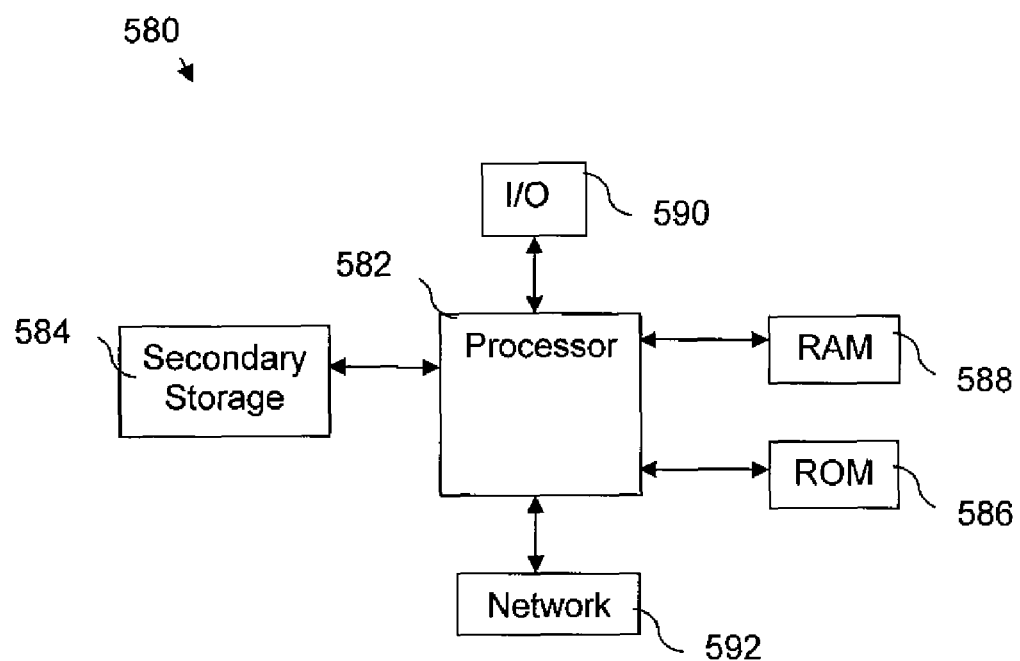
FIG. 5 illustrates an exemplary computer system suitable for implementing the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein

What is claimed is:

1. A system for service grouping in network reporting, comprising:
    a processor;
    a data retriever, stored in a memory, that, when executed by the processor, retrieves router configuration data for routers in a service provider network from data stores that are separate from the routers;
    a data analysis tool, stored in a memory, that, when executed by the processor,
        parses the router configuration data to create port data for each physical port on each router in the service provider network, wherein the port data for each physical port on each router comprises a customer name,
        integrates the port data with customer data to create an integrated database, wherein each customer data is associated with one of a plurality of customers, and wherein the integrating comprises matching the customer name included in the port data for each physical port to a corresponding one of the plurality of customers associated with each customer data,
        identifies physical ports associated with a customer of the plurality of customers,
        identifies the physical ports associated with the customer which are bundled into bundled logical ports,
        identifies the physical ports associated with the customer which are partitioned into partitioned logical ports, and
        creates a hierarchy of port information associated with the customer based on the physical ports, the bundled logical ports, the partitioned logical ports, and a service provided to the customer, wherein a primary level of the hierarchy presents bundled logical ports and partitioned logical ports associated with the customer and a secondary level of the hierarchy presents the physical ports associated with the customer, wherein the hierarchy of port information associated with the customer further comprises a history of information associated with an operational detail of at least one of the physical ports associated with the customer; and
    a user interface, stored in a memory, that, when executed by the processor, displays only the hierarchy of port information associated with the customer to enable the customer to troubleshoot ports.

2. The system of claim 1, wherein the hierarchy of port information comprises a parent port that is associated with a child port, wherein a determination of the parent port and the child port is based on the service provided to the customer, wherein the parent port comprises a port selected from the physical ports associated with the customer, the bundled logical ports, and the partitioned logical ports, and the child port comprises a different port selected from the ports associated with the customer, the bundled logical ports, and the partitioned logical ports.

3. The system of claim 1, wherein the hierarchy of port information associated with the customer comprises a first peer port that relates to a second peer port based on the service provided to the customer, wherein the first peer port comprises a port selected from the physical ports associated with the customer, the bundled logical ports, and the partitioned logical ports, and the second peer port comprises a different port selected from the physical ports associated with the customer, the bundled logical ports, and the partitioned logical ports.

4. The system of claim 3, wherein the first peer port comprises a port associated with inbound communications for a gateway and the second peer port comprises a port associated with outbound communications for the gateway.

5. The system of claim 1, wherein the hierarchy of port information associated with the customer further comprises information associated with an internet protocol address, a product, a characteristic, a bandwidth allocation, and an operational detail.

6. The system of claim 1, wherein displaying the hierarchy of port information associated with the customer comprises initially displaying only a portion of the physical ports associated with the customer, the bundled logical ports, and the partitioned logical ports.

7. The system of claim 6, wherein displaying the hierarchy of port information associated with the customer comprises responding to a selection by displaying a previously un-displayed port of the physical ports associated with the customer, the bundled logical ports, and the partitioned logical ports.

8. The system of claim 1, wherein displaying the hierarchy of port information associated with the customer comprises displaying a port of the physical ports associated with the customer, the bundled logical ports, and the partitioned logical ports as plurality of duplicate ports.

9. A computer implemented method for service grouping in network reporting, comprising:

parsing, by a data analysis tool stored in a memory and executed by a processor, router configuration data for routers in a service provider network from data stores that are separate from the routers to create port data for each physical port on each router in the service provider network and integrate the port data with customer data to create an integrated database, wherein the port data for each physical port on each router comprises a customer name;

integrating, by the data analysis tool, the port data with customer data to create an integrated database, wherein each customer data is associated with one of a plurality of customers, and wherein the integrating comprises matching the customer name included in the port data for each physical port to a corresponding one of the plurality of customers associated with each customer data;

identifying, by the data analysis tool, physical ports associated with a customer of the plurality of customers;

identifying, by the data analysis tool, the physical ports associated with the customer which are bundled into bundled logical ports;

identifying, by the data analysis tool, the physical ports associated with the customer which are partitioned into partitioned logical ports;

creating, by the data analysis tool, a hierarchy of port information based on the physical ports associated with the customer, the bundled logical ports, the partitioned logical ports, and a service provided to the customer, wherein a primary level of the hierarchy presents the bundled logical ports and partitioned logical ports associated with the customer and a secondary level of the hierarchy presents the physical ports associated with the customer, wherein the hierarchy of port information associated with the customer further comprises a history of information associated with an operational detail of at least one of the physical ports associated with the customer; and displaying only the hierarchy of port information associated with the customer via a user interface stored in a memory and executed by a processor to enable the customer to troubleshoot ports.

10. The computer implemented method of claim 9, further comprising parsing router configuration data to create the port data for each physical port on each router in a plurality of service provider networks.

11. The computer implemented method of claim 9, further comprising combining information associated with the physical ports which are bundled into the bundled logical ports to create information associated with the bundled logical ports, wherein the hierarchy of port information associated with the customer comprises the created information.

12. The computer implemented method of claim 9, further comprising dividing information associated with the physical ports which are partitioned into partitioned logical ports to create information associated with each of the partitioned logical ports, wherein the hierarchy of port information associated with the customer comprises the created information.

13. The computer implemented method of claim 9, further comprising generating a trouble ticket for failed ports based on troubleshooting ports.

14. A system for service grouping in network reporting, comprising:

a processor;

a data retriever, stored in a memory, that, when executed by the processor, retrieves router configuration data for routers in a service provider network from data stores that are separate from the routers;

a data analysis tool, stored in a memory, that, when executed by the processor, parses the router configuration data to create port data for each physical port on each router in the service provider network, wherein the port data for each physical port on each router comprises a customer name, integrates the port data with customer data to create an integrated database, wherein each customer data is associated with one of a plurality of customers, and wherein the integrating comprises matching the customer name included in the port data for each physical port to a corresponding one of the plurality of customers associated with each customer data, identifies physical ports associated with a customer of the plurality of customers, identifies the physical ports associated with the customer which are bundled into bundled logical ports, identifies the physical ports associated with the customer which are partitioned into partitioned logical ports, and creates a hierarchy of port information based on the physical ports associated with the customer, the bundled logical ports, the partitioned logical ports, a service provided to the customer, and a geographical location associated with the service, wherein a primary level of the hierarchy presents the bundled logical ports and partitioned logical ports associated with the customer and a secondary level of the hierarchy presents the physical ports associated with the customer, wherein the hierarchy of port information associated with the customer further comprises a history of information associated with an operational detail of at least one of the physical ports associated with the customer; and a user interface, stored in a memory, that, when executed by the processor, displays only the hierarchy of port information associated with the customer to enable the customer to troubleshoot ports.

15. The system of claim 14, wherein the port data comprises customer bandwidth, status, configuration, and data output.

16. The system of claim 14, wherein the partitioned logical ports are separated by a firewall.

17. The system of claim 14, wherein the hierarchy of port information associated with the customer comprises information associated with at least one of a virtual private network and a virtual private network routing and forwarding technology.

18. The system of claim 14, wherein the service is one of a voice communication service, a data communication service, a frame relay service, and an asynchronous transfer mode service.

* * * * *